(12) United States Patent
Zhao et al.

(10) Patent No.: US 10,227,723 B2
(45) Date of Patent: Mar. 12, 2019

(54) FOOT OF WASHING MACHINE WITH AUTOMATIC LEVELING FUNCTION AND WASHING MACHINE

(71) Applicants: QINGDAO HAIER WASHING MACHINE CO., LTD., Qingdao, Shandong (CN); QINGDAO HAIER SMART TECHNOLOGY R&D CO., LTD., Qingdao, Shandong (CN)

(72) Inventors: Zhiqiang Zhao, Shandong (CN); Sheng Xu, Shandong (CN)

(73) Assignees: QINGDAO HAIER WASHING MACHINE CO., LTD, Qingdao, Shandong (CN); QINGDAO HAIER SMART TECHNOLOGY R&D CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/565,197

(22) PCT Filed: Jun. 7, 2016

(86) PCT No.: PCT/CN2016/085074
§ 371 (c)(1),
(2) Date: Oct. 9, 2017

(87) PCT Pub. No.: WO2017/177530
PCT Pub. Date: Oct. 19, 2017

(65) Prior Publication Data
US 2018/0202095 A1    Jul. 19, 2018

(30) Foreign Application Priority Data
Apr. 13, 2016  (CN) .......................... 2016 1 0229105

(51) Int. Cl.
*F16M 11/24*   (2006.01)
*D06F 39/12*   (2006.01)
(Continued)

(52) U.S. Cl.
CPC ............ *D06F 39/125* (2013.01); *A47B 91/16* (2013.01); *F16M 7/00* (2013.01)

(58) Field of Classification Search
USPC ...................................... 248/188.3
See application file for complete search history.

(56) References Cited

U.S. PATENT DOCUMENTS

2,635,838 A * 4/1953 Branson ................ F16F 15/023
                                                 188/298
2,683,576 A * 7/1954 Miller ................... D06F 39/125
                                                 248/188.3
(Continued)

*Primary Examiner* — Monica E Millner
(74) *Attorney, Agent, or Firm* — Buchanan Ingersoll & Rooney PC (57) ABSTRACT

The bottom of a washing machine is provided with feet that compromise a fixed part and a movable part, and a hollow chamber is formed between the fixed part and the movable part. The hollow chamber is provided with a hydraulic medium. The feet are connected by high-pressure oil pipes, to communicate hollow chambers of the feet. Under the action of pressure, the hydraulic medium can be circulated between hollow chambers of connected feet to realize the expansion and contraction of the movable part, to execute automatic leveling. Under different pressures, the foot is made to automatically adjust adaptively due to the fluidity of the hydraulic medium. The hydraulic medium can flow between the feet, so the adjusting range is larger and can achieve better results.

9 Claims, 7 Drawing Sheets

(51) Int. Cl.
*A47B 91/16* (2006.01)
*F16M 7/00* (2006.01)

(56) References Cited

U.S. PATENT DOCUMENTS

| | | | | |
|---|---|---|---|---|
| 3,191,895 A * | 6/1965 | Whelan | ............... | F16F 9/19 |
| | | | | 248/188.3 |
| 4,593,951 A * | 6/1986 | Slaats | ............... | A47C 3/30 |
| | | | | 108/147 |
| 4,625,424 A * | 12/1986 | de La Haye | ............... | G12B 5/00 |
| | | | | 248/649 |
| 4,784,362 A * | 11/1988 | Wang | ............... | A47C 3/30 |
| | | | | 188/298 |
| 4,801,114 A * | 1/1989 | Price | ............... | D06F 39/125 |
| | | | | 248/188.3 |
| 4,949,923 A * | 8/1990 | Daily | ............... | D06F 39/125 |
| | | | | 248/188.3 |
| 4,967,994 A * | 11/1990 | Rice | ............... | D06F 39/001 |
| | | | | 248/649 |
| 5,344,116 A * | 9/1994 | Winkler | ............... | D06F 39/125 |
| | | | | 248/188.3 |
| 5,697,586 A * | 12/1997 | Lybarger | ............... | D06F 39/125 |
| | | | | 248/188.2 |
| 6,009,815 A * | 1/2000 | Hartman | ............... | A47B 91/02 |
| | | | | 108/147 |
| 7,314,206 B2 * | 1/2008 | Lee | ............... | D06F 37/20 |
| | | | | 248/188.3 |
| 7,597,294 B2 * | 10/2009 | Lotz | ............... | F16M 7/00 |
| | | | | 182/200 |
| 7,673,845 B2 * | 3/2010 | Dam | ............... | A47B 91/024 |
| | | | | 248/188.8 |
| 7,717,380 B2 * | 5/2010 | Kwon | ............... | D06F 39/125 |
| | | | | 16/44 |
| 7,744,049 B2 * | 6/2010 | Kwon | ............... | A47B 91/16 |
| | | | | 248/188.3 |
| 7,744,050 B2 * | 6/2010 | de Toledo | ............... | A47L 15/4253 |
| | | | | 248/188.3 |
| 7,900,485 B2 * | 3/2011 | Lee | ............... | D06F 39/125 |
| | | | | 248/188.8 |
| 8,104,724 B2 * | 1/2012 | Sorohan | ............... | A47B 91/16 |
| | | | | 248/188.3 |
| 8,118,379 B2 * | 2/2012 | Hong | ............... | D06F 39/125 |
| | | | | 248/188.3 |
| 2006/0021391 A1 * | 2/2006 | Yim, II | ............... | D06F 39/12 |
| | | | | 68/3 R |
| 2006/0180720 A1 * | 8/2006 | Cournoyer | ............... | A47B 91/02 |
| | | | | 248/188.2 |
| 2008/0190696 A1 * | 8/2008 | Pike | ............... | A47B 91/10 |
| | | | | 182/202 |
| 2013/0313385 A1 * | 11/2013 | Mora | ............... | F16M 7/00 |
| | | | | 248/188.4 |

* cited by examiner

FOOT OF WASHING MACHINE WITH AUTOMATIC LEVELING FUNCTION AND WASHING MACHINE

FIELD OF THE INVENTION

The present disclosure relates to a field of laundry facilities, and particularly relates to a foot of a washing machine with an automatic leveling function and a washing machine.

BACKGROUND OF THE INVENTION

A household appliance is generally provided with a leveling device at the bottom of its housing. During placement of the household appliance, the leveling device is adjusted to make the household appliance be stably placed, and after the household appliance is leveled, the leveling device is able to support the household appliance to keep the household appliance stable.

Figure 1:
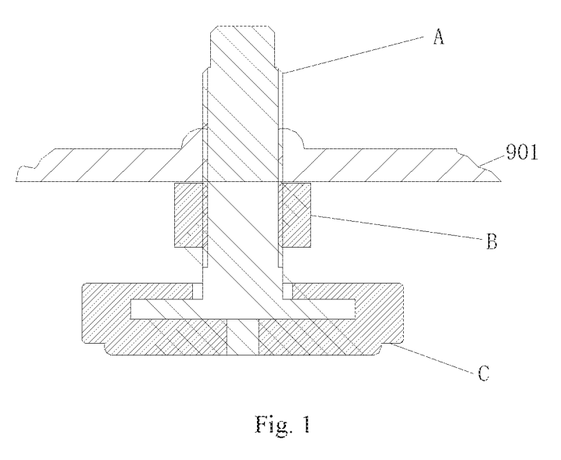
FIG. 1 is a structural schematic diagram of a foot of an existing household appliance.
Figure 2:
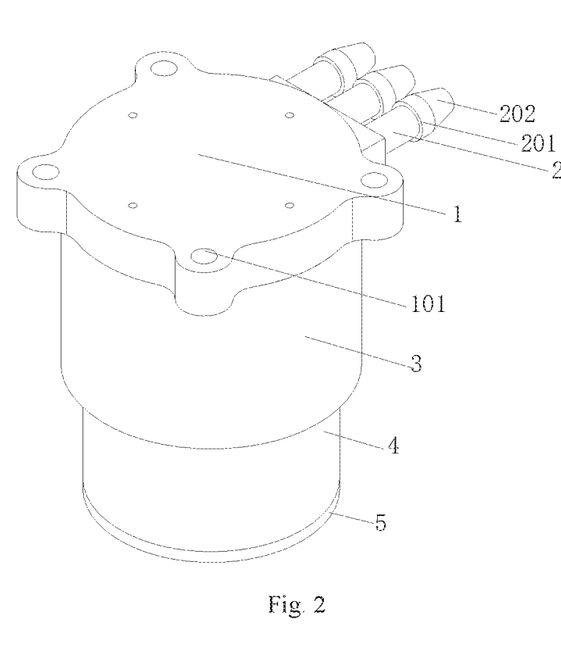
FIG. 2 is a stereo-structure schematic diagram of the foot of a washing machine of an embodiment of the present disclosure.
Figure 3:
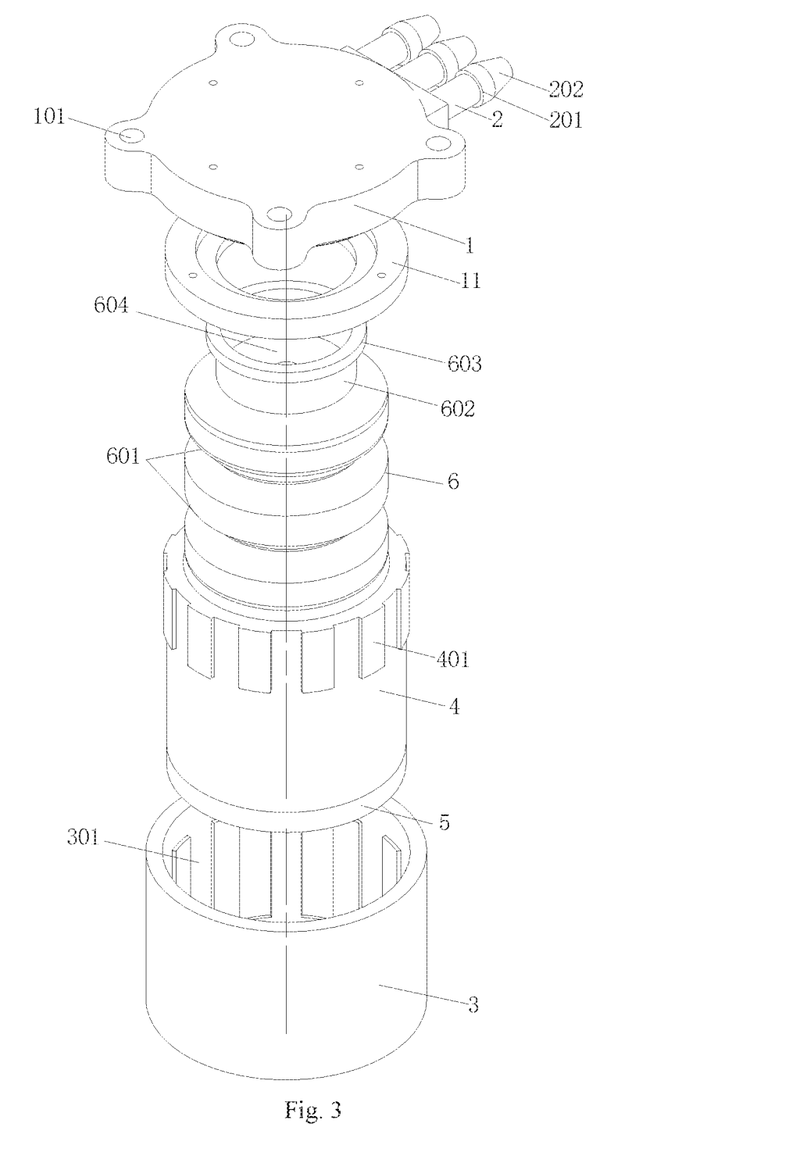
FIG. 3 is an explosive view of the structure of the foot of the washing machine of an embodiment of the present disclosure.
Figure 4:
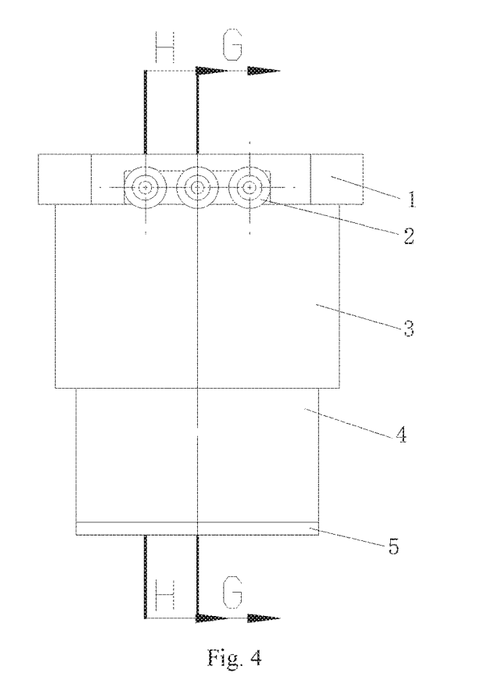
FIG. 4 is a front view of the foot of the washing machine of an embodiment of the present disclosure.
Figure 5:
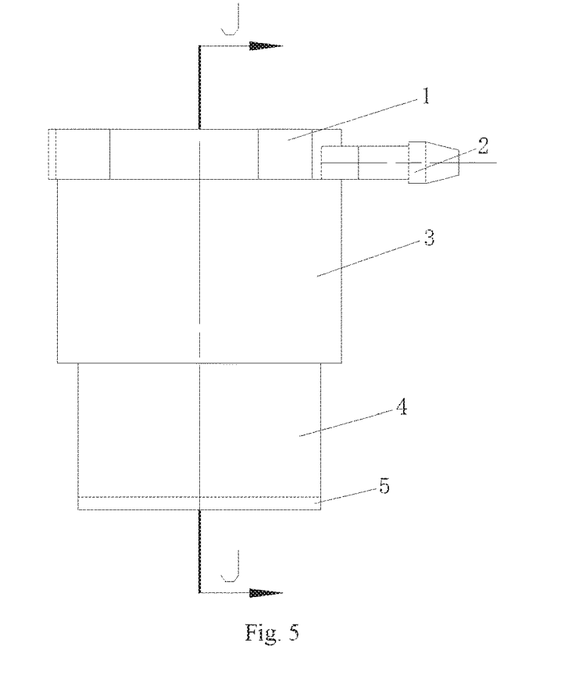
FIG. 5 is a side view of the foot of the washing machine of an embodiment of the present disclosure.
Figure 6:
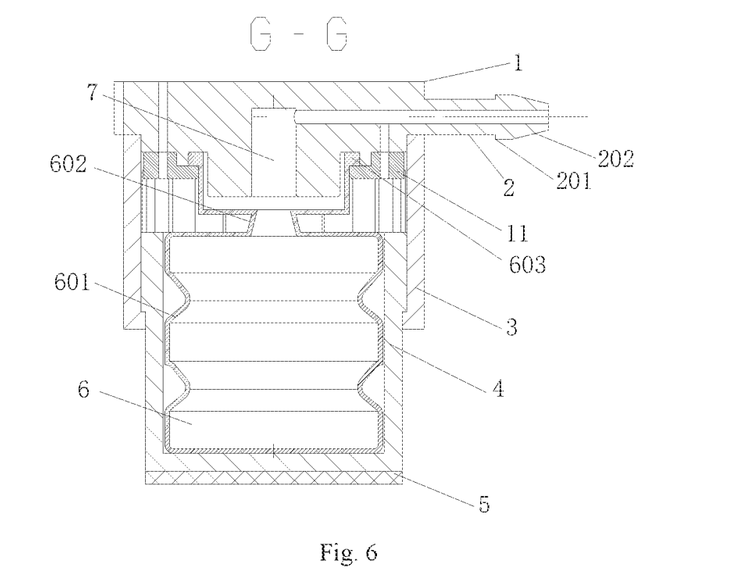
FIG. 6 is a sectional view of the foot of the washing machine of an embodiment of the present disclosure taken along section G-G plane in FIG. 4.
Figure 7:
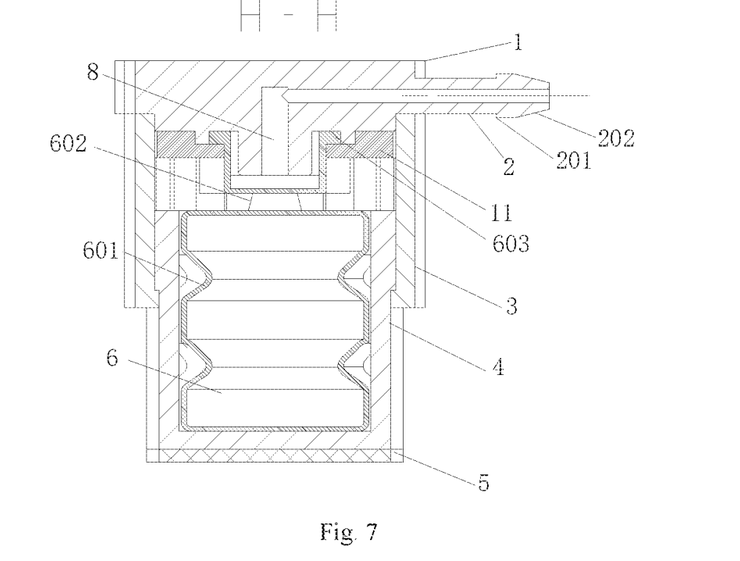
FIG. 7 is a sectional view of the foot of the washing machine of an embodiment of the present disclosure taken along section H-H plane in FIG. 4.
Figure 8:
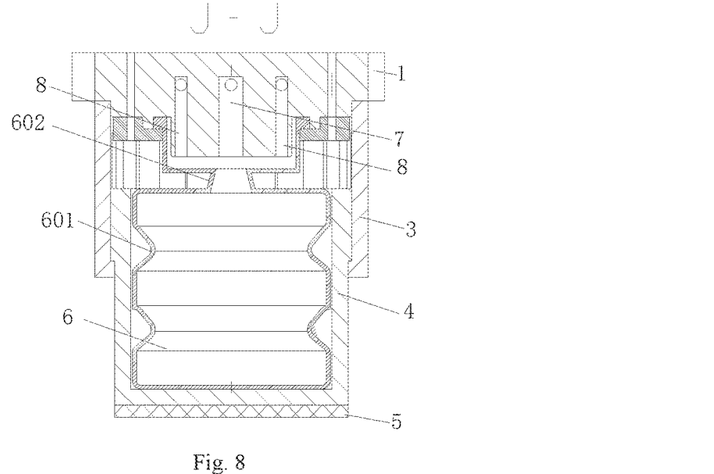
FIG. 8 is a sectional view of the foot of the washing machine of an embodiment of the present disclosure taken along section J-J plane in FIG. 5.
Figure 9:
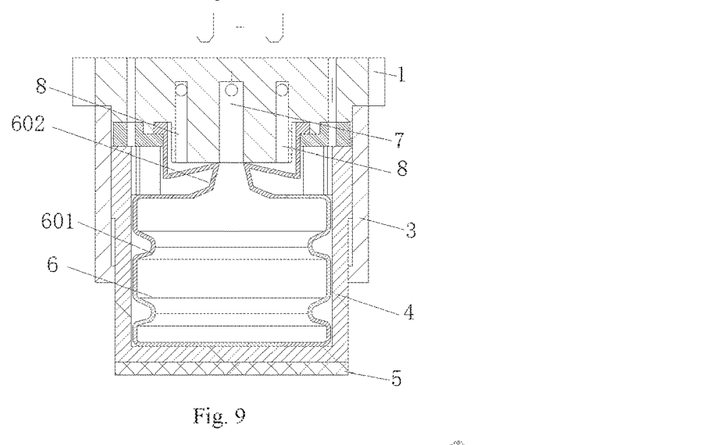

Taking a washing machine as an example, as shown in FIG. 1, feet are generally installed at a bottom plate 901 of a housing or at the bottom of the whole machine of existing washing machines. The foot comprises a screw rod A, a nut washer B and a rubber pad C. The nut washer B is able to rotate up and down around the screw rod A, and the screw rod A is also able to rotate up and down in a screw hole in a bottom plate 901. Therefore, a height adjustment of the washing machine is achieved by adjusting the lengths of the screw rods A of the feet screwed into the screw holes in the bottom plate 901. Most washing machines are risen by counterclockwise rotating the feet, and lowered by clockwise rotating the feet, and the nut washers B for preventing from loosening are screwed down to keep the feet steady after the heights of the feet are adjusted.

Although the washing machine can be leveled via adjusting the feet of the washing machine, a user needs to adjust manually; and if the washing machine is heavy or the placing space of the washing machine is small, the user is extremely inconvenient to operate. Furthermore, the vibration of the washing machine also acts on the leveling feet during a long-term working process, so that the leveling feet are prone to be failed to support, and thus the washing machine is placed unevenly.

For example, an existing 80 KG drum washing machine is generally weighing about 80 KG, which is relatively heavy, so its height adjustment is very inconvenient for users, and even though the height adjustment is completed, it cannot be ensured that the washing machine is adjusted to an optimal state. When the washing machine works, especially accelerates from 0 r/min to about 1400 r/min for drying, large vibration will occur if the washing machine is placed unevenly or the foot of the washing machine is failed to support, great vibration may be caused, and use comfort of the customers are greatly influenced.

In addition, the vibration caused by the uneven placement of the washing machine may cause loosening of foot screws which result in vertical movement of a foot bracket, and such instability may change the leveling state of the washing machine and cause stronger vibration. Due to such vicious circle, after the washing machine is used for a long term, the noise is larger and larger, the washing machine per se is also damaged to a certain extent, and the service life of the washing machine is shortened.

Therefore, the leveling of the existing washing machine has problems that manual adjustment is needed, time and labor are wasted, and precision is relatively low.

In view of the foregoing, the present disclosure is proposed.

SUMMARY OF THE INVENTION

To solve the problems mentioned above, the first object of the present disclosure is to provide a foot of a washing machine with an automatic leveling function. Specifically, the following technical scheme is adopted.

A foot of a washing machine with an automatic leveling function is provided. The bottom of the washing machine is provided with feet and the foot comprises a fixed part and a movable part, and a hollow chamber is formed between the fixed part and the movable part. The hollow chamber is provided with a hydraulic medium.

Every two feet are connected by high-pressure oil pipes and the hollow chambers of the two feet are communicated to each other. Or, all the feet are respectively connected to a communicating device by high-pressure oil pipes, and the hollow chambers of all feet are communicated with each other.

Under the action of pressure, the hydraulic medium flows inside the hollow chambers of all connected feet to realize the expansion and contraction of the movable part, to execute automatic leveling.

Further, the feet comprise a first foot and a second foot, the first foot and the second foot are respectively provided with an orifice and a valve opening which are respectively communicated with the hollow chambers. The orifice of the first foot is connected to the valve opening of the second foot by high-pressure oil pipe and the valve opening of the first foot is connected to the orifice of the second foot by the high-pressure oil pipe.

Further, the first foot and the second foot are respectively provided with one orifice and two valve openings which are a first valve opening and a second valve opening, and the orifice and the first valve opening and the second valve opening are respectively communicated with the hollow chamber.

The orifice of the first foot is connected with the first valve opening of the second foot by a high-pressure oil pipe, the first valve opening of the first foot is connected with the orifice of the second foot by a high-pressure oil pipe, and the second valve opening of the first foot is connected with the second valve opening of the second foot by a high-pressure oil pipe.

Further, the foot comprises a foot base, a flexible housing and an adjusting foot. The foot base is provided with a hollow chamber and is respectively provided with an orifice and a valve opening which are respectively communicated with the hollow chamber. The orifice and the valve opening are respectively connected with the high-pressure oil pipe.

The flexible housing is provided inside the hollow chamber and has an accommodating chamber therein. The accommodating chamber is provided with hydraulic medium therein and hydraulic medium inside the feet flows among the feet through high-pressure oil pipes under pressure.

One end of the adjusting foot is relatively slidably set in the hollow chamber and the flexible housing is in contact with or connected to the adjusting foot.

Further, the foot base comprises a base and a jacket which are connected with each other. The base is provided with a groove and a press ring is provided between the base and the jacket.

One end of the flexible housing has an opening and a sealing structure is provided at the opening. One end of the sealing structure is set in the groove and the other end keeps the sealed connection between the flexible housing and the base under the pressure of the press ring.

Further, an orifice and at least two valve openings are provided in the base. The orifice and valve openings are respectively communicated with the opening of the flexible housing and the orifice is set between the valve openings.

Under the first pressure, the orifice and valve openings are communicated. Under the second pressure, the flexible housing is compressed to block the valve openings and the orifice remains open.

Further, a fine diameter structure is provided between the opening of the flexible housing and the hollow chamber, and the internal diameter of the fine diameter structure is smaller than the internal diameter of the opening and the internal diameter of the hollow chamber.

Further, the base is provided with the orifice and the valve opening therein, and the orifice and the valve opening are respectively communicated with the opening of the flexible housing.

The base is provided with oil nipples which are respectively communicated with the orifice and the valve opening. The oil nipple is provided with an anti-stripping boss, and the external diameter of the anti-stripping boss is bigger than the internal diameter of the high-pressure oil pipe.

Further, the inwall of the jacket is provided with a vertical limiting groove, the outer wall of the adjusting foot is provided with a vertical limiting bulge, and the vertical limiting groove cooperates with the vertical limiting bulge to limit the vertically movement of the adjusting foot.

Further, the base is provided with at least one mounting hole or at least one connecting stud for assembling with the washing machine.

The second object of the present disclosure is to provide a washing machine. Specifically, the following technical scheme is adopted.

A washing machine having the above-mentioned foot of the washing machine with an automatic leveling function comprises a housing and the bottom of the housing provided with feet. The hydraulic medium being provided inside the feet of the washing machine flow between the feet to achieve the leveling.

The foot of a washing machine with an automatic leveling function of the present disclosure, according to the hydraulic principle, is provided with hydraulic medium therein. Under different pressures, the foot is made to automatically adjust adaptively due to the fluidity of the hydraulic medium. The hydraulic medium is able to flow between the feet, so the adjusting range is larger and can achieve better results.

In addition, the foot of the washing machine with an automatic leveling function holds the hydraulic medium in the enclosed flexible housing, and the flexible housing is set inside the adjusting foot. It effectively solves the problem of the leakage of the hydraulic medium and ensures the working stability of the foot.

Therefore, the structure of the foot of the washing machine of the present disclosure is simple, and the cost is low. It is easy to use and has high reliability, and it can remarkably reduce the vibration, reduce noise, and improve the comfort of the experience of the washing machine for users.

BRIEF DESCRIPTION OF THE DRAWINGS

FIG. 8 is a sectional view of the foot of the washing machine after being completely compressed of an embodiment of the present disclosure taken along section J-J plane in FIG. 5.

REFERENCE SIGNS

1—base; 101—mounting hole; 2—oil nipple; 201—anti-stripping boss; 202—guide mechanism; 203—first oil nipple; 204—second oil nipple; 205—third oil nipple; 3—jacket; 301—vertical limiting groove; 4—adjusting foot; 401—vertical limiting bulge; 5—elastic pad; 6—flexible housing; 601—bellows section; 602—fine diameter structure; 603—sealing structure; 604—opening; 7—orifice; 8—valve opening; 9—housing; 901—bottom plate; 10—foot; 11—press ring; 12—clamps; 13—high-pressure oil pipe group; 1301—first high-pressure oil pipe; 1302—second high-pressure oil pipe; 1303—third high-pressure oil pipe; 14—control panel; 15—communicating device; 16—ground; 1601—ground pit.

DETAILED DESCRIPTION OF THE INVENTION

The following is further and specific description of a foot of a washing machine with an automatic leveling function and a washing machine of the present disclosure with the drawings.

As shown in FIGS. from 2 to 9, a foot of a washing machine with an automatic leveling function in the embodiment comprises a foot base, a flexible housing 6 and an adjusting foot 4. The foot base is provided with a hollow chamber, and is respectively provided with an orifice 7 and a valve opening 8 which are communicated with the hollow chamber, and the orifice and the valve opening 8 are respectively connected with high-pressure oil pipes. The flexible housing 6 is provided inside the hollow chamber and has an accommodating chamber therein. The accommodating chamber is provided with hydraulic medium therein, and hydraulic medium inside feet is able to flow among the feet by high-pressure oil pipes under pressure. One end of the adjusting foot 4 is relatively slidably set in the hollow chamber and the flexible housing 6 is in contact with or connected to the adjusting foot 4.

The foot of a washing machine with an automatic leveling function of the present disclosure, according to the hydraulic principle, is provided with a hydraulic medium therein. Under different pressures, the foot is made to automatically adjust adaptively due to the fluidity of the hydraulic medium.

As the orifice 7 and the valve opening 8 of the foot of the washing machine in the embodiment are respectively connected with high-pressure oil pipes, and the feet are able to communicate with each other through the high-pressure oil pipes, so the adjusting range of the feet of the washing machine is wider and achieves better results.

As the foot of the washing machine of the present embodiment holds the hydraulic medium in the enclosed flexible housing 6 and the flexible housing 6 is set inside the adjusting foot 4. It effectively solves the problem of the leakage of the hydraulic medium and ensures the working stability of the foot.

Therefore, the structure of the foot of the washing machine of the present embodiment is simple, and the cost is low. It is easy to use and has high reliability, and it can remarkably reduce the vibration, reduce noise and improve the comfort of the experience of the washing machine for users.

Further, the foot base of the present embodiment comprises a base 1 and a jacket 3 which are connected with each other. The base 1 is provided with a groove, and a press ring 11 is provided between the base 1 and the jacket 3. One end of the flexible housing 6 has an opening 604 where a sealing structure 603 is provided. One end of the sealing structure 603 is set in the groove and the other end keeps the sealed connection between the flexible housing 6 and the base 1 under the pressure of the press ring 11.

Further, an orifice 7 and at least two valve openings 8 are provided in the base 1 of the present embodiment. The orifice 7 and valve openings 8 are respectively communicated with the opening 604 of the flexible housing 6 and the orifice 7 is set between the valve openings 8. Under the first pressure, the orifice 7 and valve openings 8 both remain open. Under the second pressure, the flexible housing 6 is compressed to block the valve openings 8 and the orifice 7 remains open.

The base 1 is provided with oil nipples 2 which are respectively communicated with the orifice 7 and valve openings 8. The oil nipple 2 is provide with an anti-stripping boss 201. The external diameter of the anti-stripping boss 201 is bigger than the internal diameter of the high-pressure oil pipe, and specifically is from 0.1 mm to 1.5 mm.

The starting end of the oil nipple 2 is provided with a guide mechanism 202 and specifically the guide mechanism 202 is a chamfer structure, making the starting end of the oil nipple easily insert into the oil pipes.

Specifically, as show in figures, the foot of the washing machine of the embodiment comprises an orifice 7 and two valve openings 8, and the orifice 7 is set between the two valve openings 8. The orifice 7 is connected to a second oil nipple 204 and two valve openings 8 are respectively connected to a first oil nipple 203 and a third oil nipple 205.

The base 1 is provided with mounting holes 101 and is able to be secured to the bottom plate 901 by bolts or screws. It is easy to conceive that the central location of the base 1 has a screw column, screwing into the bottom plate 901 of the washing machine.

A fine diameter structure 602 is provided between the opening 604 of the flexible housing 6 and the hollow chamber of the feet of the washing machine in the embodiment, and the internal diameter of the fine diameter structure 602 is smaller than both the internal diameter of the opening 604 and the internal diameter of the hollow chamber.

The central section of the fine diameter structure 602 of the flexible housing 6 in the embodiment is provided with an oil hole which is communicated with the opening 604. The characteristic of the fine diameter structure 602 is that the oil hole can keep oil as the hydraulic medium flowing into or flowing out of the orifice 7 and the valve opening 8. Once the adjusting foot 4 is subject to the pressure too large, the rubber on the peripheral of the fine diameter structure 602 sticks to the base 1, to seal the valve opening 8, which achieves greater throttling effect.

The flexible housing 6 in the present embodiment has a bellows section and the interior of the bellows section is the hollow chamber. The bellows section allows the flexible housing 6 to be compressed or elongated without creating an unnecessary press-pleating, which is to extend service life.

According to the feet of the washing machine of the embodiment, the inwall of the jacket 3 is provided with a vertical limiting groove 301, the outer wall of the adjusting foot 4 is provided with a vertical limiting bulge 401, and the vertical limiting groove 301 cooperates with the vertical limiting bulge 401 to limit the vertical movement of the adjusting foot. This setting has the following advantages:

(1) making the adjusting foot 4 move up and down vertically, with no occurrence of side deviation;

(2) preventing the rotation of the adjusting foot 4 in the jacket 3, greatly reducing the vibration of the washing machine;

(3) effectively preventing the adjusting foot 4 from falling off the jacket 3, avoiding the flexible housing 6 from bursting or directly contacting the ground due to sharp objects.

As shown in FIG. from 10 to 14, a foot of a washing machine with an automatic leveling function is provided in the embodiment. The bottom of the washing machine is provided with feet 10 and the foot 10 comprises a fixed part and a movable part, and a hollow chamber is formed between the fixed part and the movable part. The hollow chamber is provided with a hydraulic medium. Every two feet 10 are connected by a high-pressure oil pipe to make the hollow chambers of the feet communicate with each other. Or, all the feet 10 are separately connected to a communicating device 15 through high-pressure oil pipes, so the hollow chambers of all feet are communicated with each other. Under the action of pressure, the hydraulic medium is able to be circulated between hollow chambers of all connected feet 10 to realize the expansion and contraction of the movable part, to execute automatic leveling.

The hydraulic medium compresses gas when the foot of the washing machine of the embodiment is under a certain pressure, and the adaptive expansion and contraction of the movable part is followed. When the pressure increases further, the gas is no longer compressed, the internal pressure of the gas reacts to the hydraulic medium and the movable part is able to have sufficient support force therewith. Therefore, the foot of the washing machine of the embodiment has an adaptive automatic leveling function. The hydraulic medium of the embodiment is specifically hydraulic oil.

The foot of a washing machine with an automatic leveling function of the present embodiment, according to the hydraulic principle, is provided with a hydraulic medium therein. Under different pressures, the foot is made to automatically adjust adaptively due to the fluidity of the hydraulic medium. The hydraulic medium can flow between all feet. When one of the feet is subjected to compression, the hydraulic medium flows to the other foot communicated with it. The amount of the hydraulic medium in the other foot increases, and the pressure increases to make the foot stretch out so as to ensure sufficient support force. The adjusting range of the feet of the washing machine is wider and can achieve better results.

Therefore, the structure of the foot of the washing machine of the present embodiment is simple, and the cost is low. It is easy to use and has high reliability, and it can remarkably reduce the vibration, reduce noise, and improve the comfort of the experience of the washing machine for users.

A drum washing machine is taken as an example in the present disclosure. The drum washing machine comprises:

a washing drum for holding and washing clothes, a detergent box for storing powder detergent, liquid detergent or softener, a control pane 114 for operating the washing machine a window for opening to remove or put in clothes, a motor assembly connecting at least one rotatable drive shaft for realizing at least one output, a housing 9 for keeping an entire frame and an exterior of the washing machine, and a bottom plate 901 for installing the feet of the washing machine of the present embodiment at below.

Figure 10:
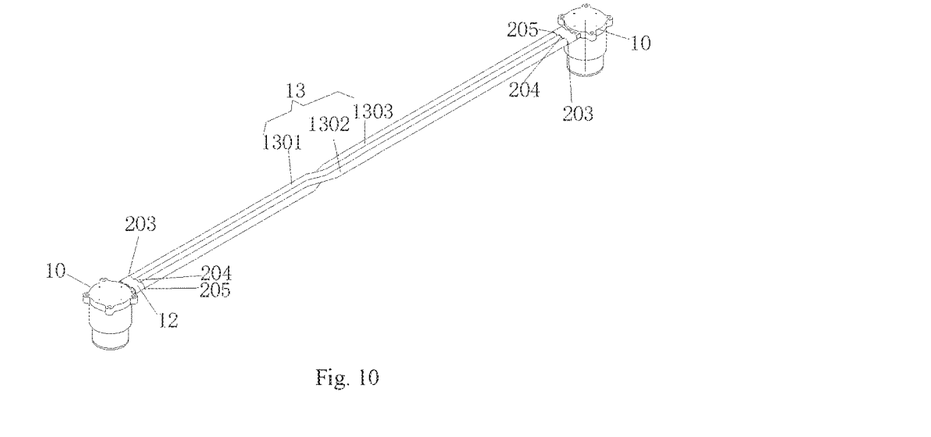
FIG. 10 is schematic diagram showing a combined installation of the foot of the washing machine of an embodiment of the present disclosure.

As shown in FIG. 10, feet of a washing machine in the present embodiment comprises a first foot and a second foot, the first foot and the second foot are respectively provided with orifices 7 and valve openings 8, and the orifices 7 and valve openings 8 are respectively communicated with the hollow chamber. The orifice 7 of the first foot is connected to the valve opening 8 of the second foot by high-pressure oil pipes, and the valve opening 8 of the first foot is connected to the orifice 7 of the second foot by high-pressure oil pipes.

Specifically, the first foot and the second foot are respectively provided with one orifice 7 and two valve openings 8 which are a first valve opening and a second valve opening, and the orifice 7, the first valve opening and the second valve opening are respectively communicated with the hollow chamber. The orifice 7 of the first foot is connected with the first valve opening of the second foot through a second high-pressure oil pipe 1302, the first valve opening of the first foot is connected with the orifice 7 of the second foot through a first high-pressure oil pipe 1301 and the second valve opening of the first foot is connected with the second valve opening of the second foot through a third high-pressure oil pipe 1303. The first high-pressure oil pipe 1301, the second high-pressure oil pipe 1302 and the third high-pressure oil pipe 1303 mentioned constitute a high-pressure oil pipe group 13.

Figure 11:
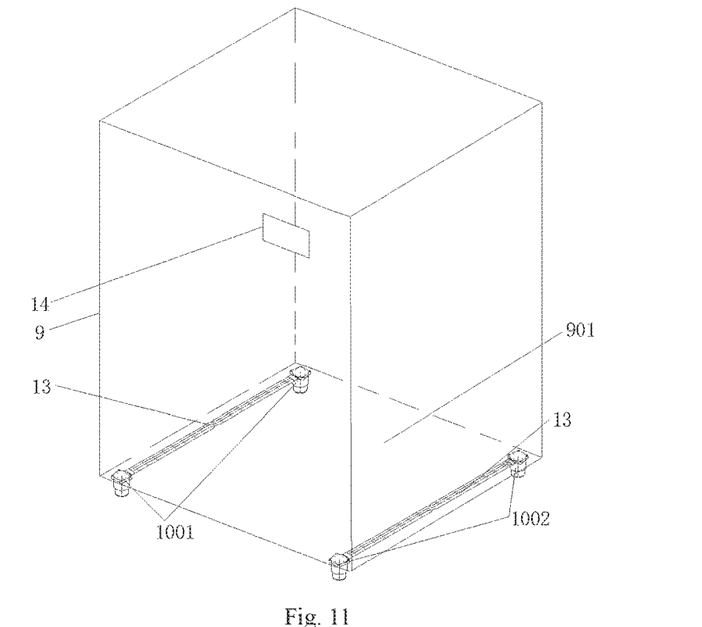
FIG. 11 is an installation schematic diagram showing the foot of the washing machine of an embodiment of the present disclosure mounted on the washing machine.

Specifically, as shown in FIG. 11, four feet are fixedly mounted to four corners of the bottom plate 901 of the washing machine. The high-pressure oil pipe group 13 communicates with two feet on the left of the bottom plate 901 of the washing machine, constituting a first foot group 1001. The high-pressure oil pipe group 13 communicates with two feet on the right of the bottom plate 901 of the washing machine, constituting a second foot group 1002.

In this way, it enables the hydraulic medium and part of the gas of the first foot group 1001 to flow mutually between the two feet under different pressures. And it enables hydraulic medium and part of the gas of the second foot group 1002 to flow mutually between the two feet under different pressures.

Figure 12:
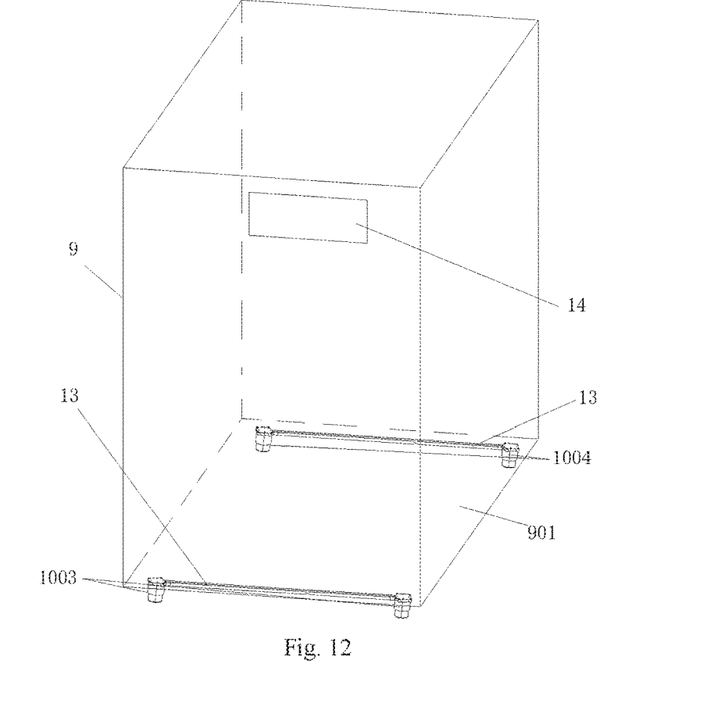
FIG. 12 is an installation schematic diagram showing the foot of the washing machine of another embodiment of the present disclosure mounted on the washing machine.

As shown in FIG. 12, four feet are fixedly mounted to four corners of the bottom board 901 of the washing machine. The high-pressure oil pipe group 13 communicates with two feet at the rear of the bottom plate 901 of the washing machine, constituting a third foot group 1003. The high-pressure oil pipe group 13 communicates with two feet at the front of the bottom plate 901 of the washing machine, constituting a fourth foot group 1004.

In this way, it enables the hydraulic medium and part of the gas of the third foot group 1003 to flow mutually between the two feet under different pressures. And it enables hydraulic medium and part of the gas of the fourth foot group 1004 to flow mutually between the two feet under different pressures.

Figure 13:
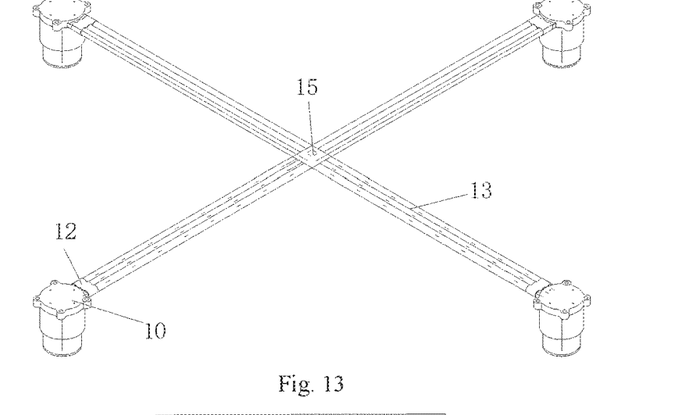
FIG. 13 is schematic diagram showing a combined installation of the foot of the washing machine of another embodiment of the present disclosure.
Figure 14:
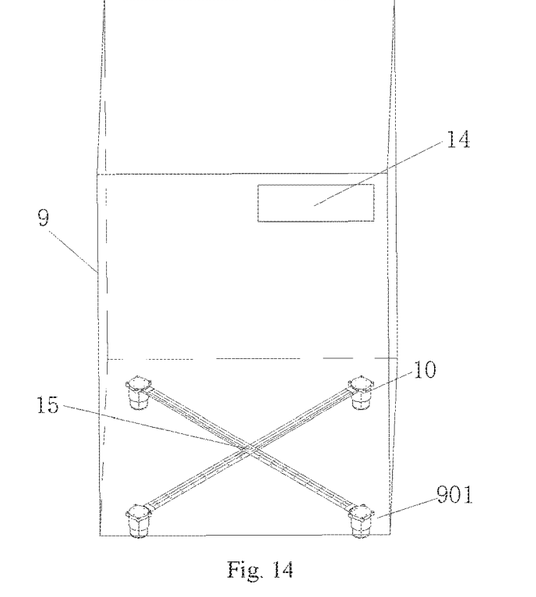
FIG. 14 is an installation schematic diagram showing the foot of the washing machine of another embodiment of the present disclosure mounted on the washing machine.

As shown in FIGS. 13 and 14, at least four feet that are communicated with each other are provided evenly at four corners of the bottom plate 901 of the housing 9 or along the circumferential direction of the bottom plate 901 of the housing 9. Each foot 10 is filled with hydraulic medium and gas. Within the first range of pressure, the hydraulic medium and the gas inside the each foot 10 interact with each other to realize the expansion and the contraction of the movable part, to level automatically. Within the second range of pressure, the hydraulic medium and the gas inside the communicated feet 10 interact with each other to realize the expansion and the contraction of the movable part, to level automatically. In this way all the feet are communicated with each other, and the liquid medium is able to flow between all the feet. The range of adjustment is larger, and the effect of adjustment is better.

Specifically, an enclosed chamber which is filled with hydraulic medium and gas is provided inside the foot 10. The enclosed chamber is communicated with the high-pressure oil pipe group 13, and high-pressure oil pipe group 13 of each foot 7 is respectively communicated to a communicating device 15 to achieve the mutual communication between all the feet 10.

The foot of the washing machine of the present embodiment uses the gas as the elastic medium and the liquid medium as the force transmission medium. It not only has a good ability of cushioning, but also has a damping effect. At the same time, it can also adjust the height of the foot itself according to the pressure it withstands.

Figure 15:
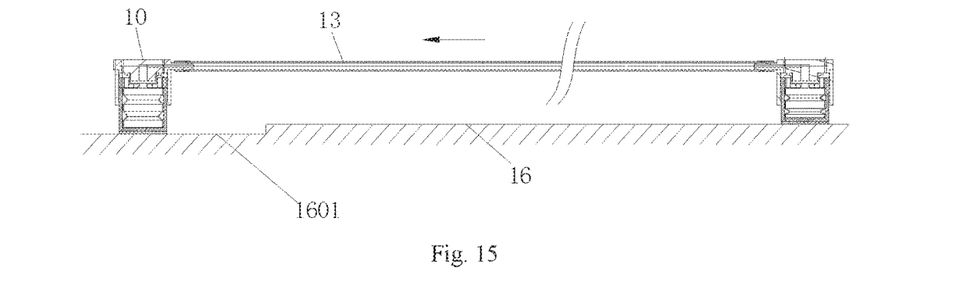
FIG. 15 is a schematic diagram of the foot of the washing machine in working state of an embodiment of the present disclosure.

As shown in FIG. 15, the principle of leveling is specifically explained. When the washing machine is installed, it results in different levels of different feet height because the ground 16 is uneven, and the position of the foot located in a ground pit 1601 is low. It is possible to know that the foot in the high position bears the weight of the washing machine firstly and bears great gravity. The foot in the low position is failed to support or bears small gravity. The adjustable foot of the foot in the high position moves upward under great pressure, and the height of the entire foot gets small to make the volume of the hollow chamber of the flexible housing to be compressed and reduced, forcing the hydraulic medium to flow into the orifice or the valve opening and flow into the foot which is in the lower position through the high-pressure oil pipe group. So that the hydraulic medium of the flexible housing 6 of the foot in the lower position gets more and more and the flexible housing expands to drive the adjusting foot to extend.

When hydraulic pressures of the foot in the higher position and the foot in the lower position are equal, the hydraulic medium no longer flows through the high-pressure oil pipe group and the relative positions of the adjustable foot and the bottom board of the washing machine no longer change, and the automatic adjustment of the feet of the washing machine is completed.

In the washing process and the spinning process of the washing machine, because the hydraulic medium flows slowly to self-level, the vibration noise of the washing machine is greatly reduced.

A washing machine which has the above-mentioned foot of a washing machine with an automatic leveling function is provided at the same time in the embodiment. The washing machine comprises a housing 9, and the bottom of the housing 9 is provided with a number of the feet mentioned. The hydraulic medium provided inside the feet of the washing machine can flow inside the feet or between the feet to achieve the leveling.

The factory setting of the washing machine of the embodiment is preferably that heights of four feet of the washing machine are the same. The washing machine is randomly placed on an uneven ground and the four feet bear different pressures according to the uneven states, and then the lengths that adjustable feet are pressed into sheaths are different, so that the automatic leveling of the washing machine is realized.

Further illustrations for the above embodiments are as follows:

1. Every two of the feet of the embodiments of the present disclosure are communicated. It can be three or more, and the number N≥2, preferably two. It costs the lowest and can achieve better results.

Four end openings of the communicating device 15 are applied to be respectively connected with four feet. It is reasonable that three, five, six or N end openings of the communicating device 15 are applied, and the end openings are respectively connected with three, five, six or N feet. The above-described embodiments apply four feet which is the most suitable merely in the situation of being capable of achieving the described functions, to control the cost to the minimum.

2. In the embodiment of the present disclosure, by taking a drum washing machine for example, the principle and the method for implementing the automatic leveling of the drum washing machine are explained, and it is easy to be conceived that the present disclosure can be applied to pulsator washing machines.

3. In the embodiments of the present disclosure, by taking a washing machine for example, the principle and the method for implementing the automatic leveling of the washing machine are explained, and it is easy to be conceived that the present disclosure can be applied to household appliances, such as refrigerators, freezers, dish washing machines and the like.

What described above are only preferred embodiments of the present disclosure, but are not intended to limiting the scope of the present invention in any forms. Although the present disclosure has been disclosed in terms of preferred embodiments, it is not limited thereto. Without departing from the scope of the technical solution of the present invention, any persons skilled in the present disclosure can make equivalent embodiments with various alterations and modifications as equivalent variations by utilizing the above-mentioned technical contents. However, without departing from the contents of the technical solution of the present disclosure, any simple changes, equivalent variations and modifications made according to the technical essence of the present disclosure shall all be covered within the scope of the technical solution of the present disclosure.

The invention claimed is:

1. Feet of a washing machine with automatic leveling function, which is provided at a bottom of the washing machine, wherein: each of the feet comprises a fixed part and a movable part, a hollow chamber is formed between the fixed part and the movable part, and the hollow chamber is provided with a hydraulic medium, and every two feet are connected by a high-pressure oil pipe to communicate between the hollow chambers of the every two feet, or all the feet are respectively connected to a communicating device by high-pressure oil pipes to communicate among the hollow chambers of all the feet, and the hydraulic medium flows between hollow chambers of the feet communicated with each other to expanding and contracting the movable part under pressure to execute automatic leveling;

the feet comprise a first foot and a second foot which are respectively provided with one orifice and two valve openings which are a first valve opening and a second valve opening, the orifice, the first valve opening and the second valve opening are respectively communicated with the hollow chamber, the orifice of the first foot is connected with the first valve opening of the second foot through the high-pressure oil pipe, the first valve opening of the first foot is connected with the orifice of the second foot through the high-pressure oil pipe, and the second valve opening of the first foot is connected with the second valve opening of the second foot through the high-pressure oil pipe.

2. The feet of the washing machine with automatic leveling function according to claim 1, wherein: each of the feet comprises a foot base, a flexible housing and an adjusting foot, and the foot base is provided with the hollow chamber, the foot base is respectively provided with the orifice and the valve opening which are respectively connected with the high-pressure oil pipe, the flexible housing is provided inside the hollow chamber, and the flexible housing is provided with an accommodating chamber therein which is provided with the hydraulic medium, the hydraulic medium inside the feet flows among the feet through high-pressure oil pipes under pressure, and one end of the adjusting foot is relatively slidably set in the hollow chamber, and the flexible housing is in contact with or connected to the adjusting foot.

3. The feet of the washing machine with automatic leveling function according to claim 2, wherein: the foot base comprises a base and a jacket which are connected with each other, the base is provided with a groove, and a press ring is provided between the base and the jacket, and one end of the flexible housing is an opening on which a sealing structure is provided, one end of the sealing structure is set in the groove and the other end keeps a sealed connection between the flexible housing and the base under pressure of the press ring.

4. The feet of the washing machine with automatic leveling function according to claim 3, wherein: one orifice and at least two valve openings are provided in the base, the orifice and valve openings are respectively communicated with the opening of the flexible housing, the orifice is set between the valve openings, under the first pressure, the orifice and valve openings both remain open, and under the second pressure, the flexible housing is compressed to block the valve openings and the orifice remains open.

5. The feet of the washing machine with automatic leveling function according to claim 2, wherein: the base is provided with the orifice and the valve opening therein, and the orifice and valve opening are respectively communicated with the opening of the flexible housing, the base is provided with oil nipples, the oil nipples are respectively communicated with the orifice and valve opening, the oil nipple is provided with an anti-stripping boss and an external diameter of the anti-stripping boss is bigger than an internal diameter of the high-pressure oil pipe.

6. The feet of the washing machine with automatic leveling function according to claim 2, wherein: an inwall of the jacket is provided with a vertical limiting groove, an outer wall of the adjusting foot is provided with a vertical limiting bulge, the vertical limiting groove cooperates with the vertical limiting bulge to limit the vertical movement of the adjusting foot.

7. The feet of the washing machine with automatic leveling function according to claim 2, wherein: the base is provided with at least one mounting hole or at least one connecting stud which is used for assembly with the washing machine.

8. A washing machine having the feet of a washing machine with automatic leveling function according to claim 1, wherein: the washing machine comprises a housing, a bottom of the housing provided with feet of the washing machine, the hydraulic medium is provided inside the feet of the washing machine and flows among the feet to level.

9. The feet of the washing machine with automatic leveling function according to claim 4, wherein: a fine diameter structure is provided between the opening of the flexible housing and the hollow chamber, and an internal diameter of the fine diameter structure is smaller than an internal diameter of the opening and an internal diameter of the hollow chamber.

* * * * *